Nov. 9, 1965 A. S. ROBINSON 3,217,148

PULSE RATE FUNCTION GENERATION

Filed June 28, 1960 3 Sheets-Sheet 1

INVENTOR.
ARTHUR S. ROBINSON
BY Charles J. Worth
AGENT

INVENTOR.
ARTHUR S. ROBINSON
BY Charles J. Worth
AGENT

| PULSES | STATE OF FLIP FLOP 7a | 7b | 7c | PULSES p | p1 | p2 | p3 |
|---|---|---|---|---|---|---|---|
| | 0 | 0 | 0 | | | | |
| 1 | 1 | 0 | 0 | — | — | | |
| 2 | 0 | 1 | 0 | — | | — | |
| 3 | 1 | 1 | 0 | — | — | | |
| 4 | 0 | 0 | 1 | — | | | — |
| 5 | 1 | 0 | 1 | — | — | | |
| 6 | 0 | 1 | 1 | — | | — | |
| 7 | 1 | 1 | 1 | — | — | | |
| 8 | 0 | 0 | 0 | — | | | |
| 9 | 1 | 0 | 0 | — | — | | |
| 10 | 0 | 1 | 0 | — | | — | |
| 11 | 1 | 1 | 0 | — | — | | |
| 12 | 0 | 0 | 1 | — | | | — |
| 13 | 1 | 0 | 1 | — | — | | |
| 14 | 0 | 1 | 1 | — | | — | |
| 15 | 1 | 1 | 1 | — | — | | |
| 16 | 0 | 0 | 0 | — | | | |
| 17 | 1 | 0 | 0 | — | — | | |
| 18 | 0 | 1 | 0 | — | | — | |

| ENERGIZED LINES TO GATES 910 TO 927 | DATA PULSES AT $S_1$: PULSES TO GATES 910 TO 927 | | | DATA PULSE RATE | DATA PULSES AT $S_2$: PULSES TO GATES 910 TO 927 | | | DATA PULSE RATE |
|---|---|---|---|---|---|---|---|---|
| M1A1 | | | p3 | .125f | | | p3 | .125f |
| M1A2 | | p2 | p3 | .375f | | p2 | | .250f |
| M1A3 | p1 | | p3 | .625f | | p2 | p3 | .375f |
| M2A1 | | p2 | | .250f | | p2 | | .250f |
| M2A2 | p1 | | | .500f | p1 | | | .500f |
| M2A3 | p1 | p2 | | .750f | p1 | | p3 | .675f |
| M3A1 | p1 | | | .500f | p1 | | | .500f |
| M3A2 | p1 | p2 | | .750f | p1 | | p3 | .675f |
| M3A3 | p1 | p2 | p3 | .875f | p1 | p2 | | .750f |

INVENTOR.
ARTHUR S. ROBINSON
BY Charles J. Worth
AGENT 3,217,148
PULSE RATE FUNCTION GENERATION Arthur S. Robinson, Allendale, N.J., assignor to The Bendix Corporation, Teterboro, N.J., a corporation of Delaware Filed June 28, 1960, Ser. No. 39,287
11 Claims. (Cl. 235—164)

This invention generally relates to function generation and more specifically to means for providing data pulses having variable pulse rates as a function of a plurality of variables.

This invention is particularly adapted to devices providing computer processing data in pulse form, and will be described in an electronic aircraft control system of this type. It is well-known that the amount of control required by an aircraft and the control reaction time to commands varies with the speed and the altitude of the aircraft to provide a predetermined degree of control. Therefore, electronic computer type aircraft control systems require means for selectively varying or modulating pulse rates of data pulses as a function of the parameters, Mach and altitude.

An object of this invention is to provide a function generation circuit in computer devices capable of providing data pulses which are pulse rate modulated as a function of multiple variables.

This invention contemplates a function generation circuit including a matrix array for applying signals as a function of variables to gate means to which are applied plural pulse trains or anticarries at a preselected rate or rates that are a function of a pulse counter to provide rate modulated data pulses representing the instantaneous ranges of the multiple variables.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1A:
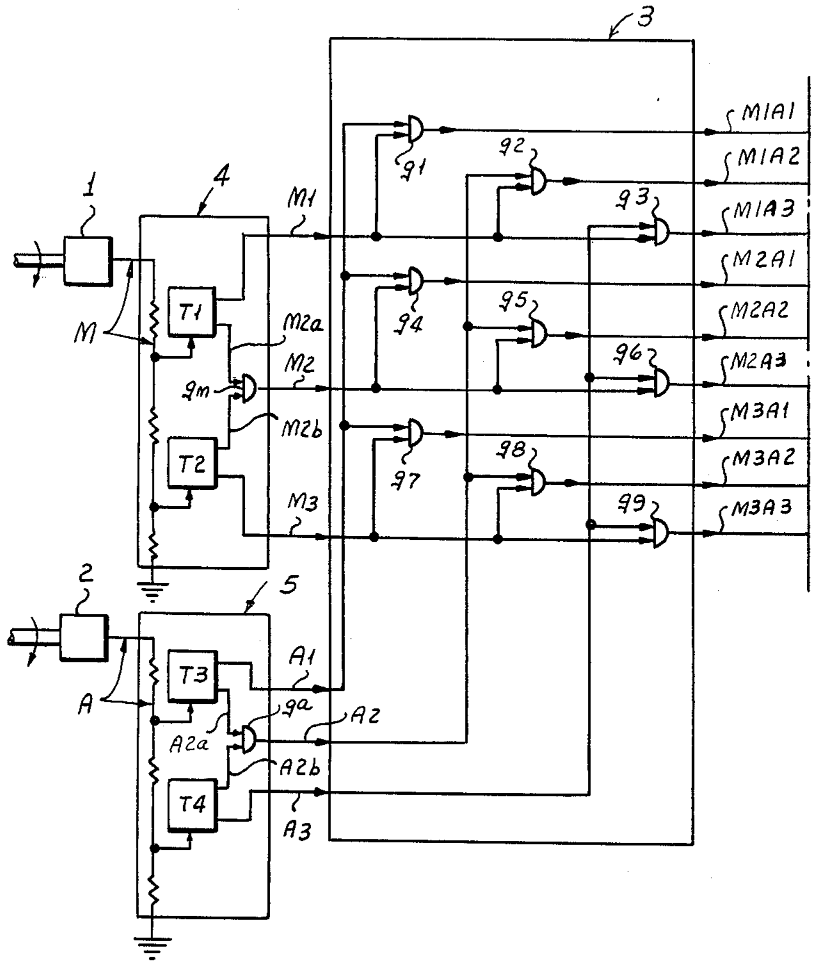
Figure 1B:
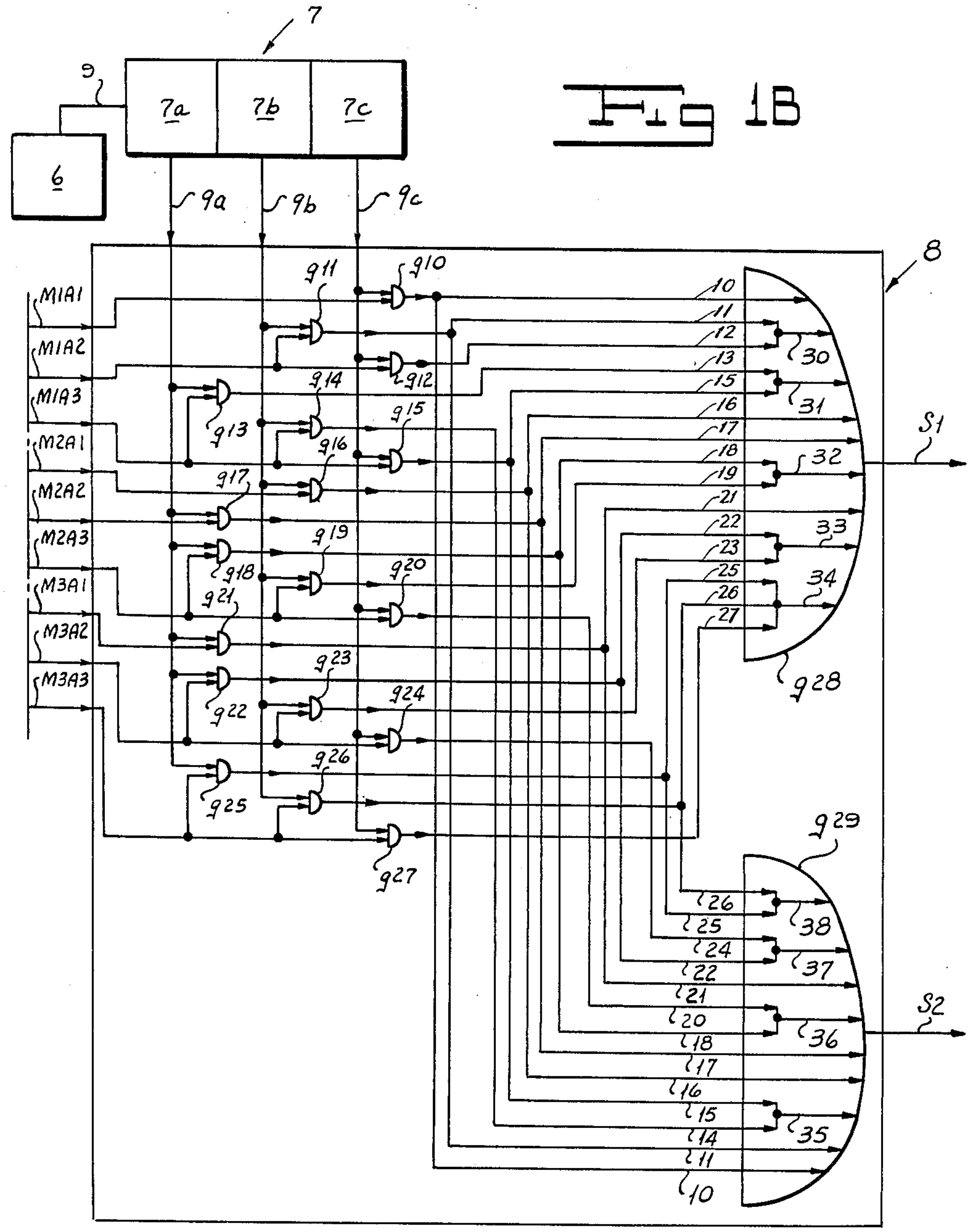
Figures 2, 3, 4:
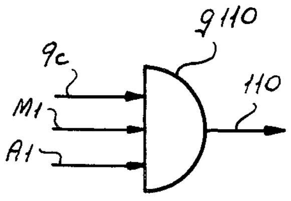

FIGURES 1A and 1B taken together diagrammatically show a novel circuit constructed according to the invention, FIGURE 2 is a chart of the various states of a counter of FIGURE 1B, and the pulses produced by the counter, FIGURE 3 is a chart of the input connections of FIGURE 1B, the pulses applied to the input connections, and the data pulse rates at the circuit outputs, and, FIGURE 4 diagrammatically shows a modified gate.

In considering matrix arrays, read-in or function range lines are in a series which is limited in number only by the application requirements presented by the device using this technique. To facilitate description of the invention, the series of matrix read-in lines have been limited to M1, M2, M3, and A1, A2, A3. The pulse train or anti-carry transmission lines have been similarly limited to 9*a*, 9*b*, 9*c* while the circuit outputs have been limited to S1, S2. The associated components included in the novel circuit are necessarily limited to the number required to present the representative function signals, anti-carries and data pulses.

Referring to FIGURE 1A, a source 1 is connected by a line M to an electronic commutating signal deriving network 4 which provides voltage signals representing Mach to a matrix portion 3. A source 2 is connected by a line A to a similar network 5 which provides voltage signals representing altitude to matrix portion 3. The signal deriving networks 4 and 5 are of the character shown and described in the co-pending patent application of W. Henn and M. Teitelbaum, Serial No. 39,290, filed June 28, 1960, now Patent No. 3,165,638, and assigned to the same assignee as the present application.

In network 4, the line M is connected to triggers T1 and T2 each having two outputs. The trigger T1 has Mach range line M1 connected to one output, and a line M2*a* connected to the other output and to one side of an AND gate G*m*. The trigger T2 has a line M2*b* connected to one output and to the second side of gate G*m*, and Mach range line M3 connected to the other output. An initial application of low voltage by line M to network 4 representing the first Mach range is applied to trigger T1 in its first state and energizes line M1. Increasing the voltage presented by line M to represent the second Mach range fires trigger T1 de-energizing line M1 and energizing line M2*a*, and simultaneously the trigger T2 in its first state energizes line M2*b*. With lines M2*a* and M2*b* energized, AND gate G*m* has both sides qualified and energizes the second range line M2. A further increase in voltage representing the third Mach range will fire trigger T2 to de-energize line M2*b* and energize line M3. When line M2*b* is de-energized, only one side of gate G*m* is qualified and it will not conduct, therefore line M2 is de-energized. The network 5, energized by voltage from source 2, includes electronic triggers T3 and T4, AND gate G*a*, and lines A2*a* and A2*b*, corresponding to the similar components of network 4, to selectively and singularly energize line A1 representing the first altitude range, line A2 representing the second altitude range, or line A3 representing the third altitude range, in a manner described relative to network 4 with respect to Mach number.

The Mach and altitude range lines are connected to a series of AND gates in a manner to interconnect each Mach range line of network 4 with each altitude range line of network 5, and provide read-out lines from the matrix portion 3 representing the interconnections.

This is accomplished by connecting Mach range lines M1 to one side of AND gates G1, G2 and G3, M2 to one side of AND gates G4, G5 and G6, and M3 to one side of AND gates G7, G8 and G9. Altitude range lines A1, A2 and A3 are connected to AND gates G1, G4 and G7, gates G2, G5 and G8, and gates G3, G6 and G9, respectively. The gates G1, G2 . . . and G9 have output lines M1A1, M1A2, M1A3, M2A1, M2A2, M2A3, M3A1, M3A2 and M3A3, respectively, which are read-out lines of matrix portion 3 and read-in lines of a second matrix portion 8. Although each of the Mach and altitude range lines are connected to three of the AND gates G1, G2 . . . and G9, only one Mach range line and one altitude range line is energized, therefore, only one gate will conduct in response to Mach and altitude signals, and energize its output line M1A1, M1A2 . . . or M3A3.

Referring specifically now to FIGURES 1B and 2, a pulse generator 6 provides pulses P at a pulse rate *f* to the input 9 of a counter 7 comprised of cascaded flip-flops 7*a*, 7*b* and 7*c* having respective transmission lines 9*a*, 9*b* and 9*c* connected to matrix portion 8. As indicated in FIGURE 2, each time the state of a flip-flop goes from 0 to 1, a pulse or anticarry is available to the matrix portion 8 from that flip-flop. Each time the state of a flip-flop goes from 1 to 0, the state of the following flip-flop goes from 0 to 1 or 1 to 0, depending upon its state when it is activated. Since the flip-flop 7*a* changes its state in response to each pulse P it will produce pulses P1 at one-half of the pulse rate *f* of the pulses P from the signal generator 6, or at a .500*f* pulse rate. The flip-flop 7*b* is responsive to pulses P when the state of flip-flop 7*a* goes from 1 to 0 and will produce pulses P2 in response to every fourth pulse P or at a .250*f* pulse rate. The flip-flop 7*c* is responsive to pulses P when the state of flip-flop 7b goes from 1 to 0 and will produce pulses P3 in response to every eighth pulse P or at .125f pulse rate.

The various lines M1A1, M1A2 . . . and M3A3 of matrix portion 8 are selectively connected to pulse transmission lines 9a, 9b and 9c providing anticarries P1, P2 and P3, respectively, by AND gates G10, G11 . . . and G27 to provide data pulses at a predetermined or modulated pulse rate or rates corresponding to the rate or rates of the anticarries. The connections are shown in FIGURE 1B, and FIGURE 3 is a chart of the pulses that are applied to the combined Mach/altitude signals to produce data pulse rates at outputs S1 and S2. It should be understood that the various pulse rates have been arbitrarily chosen for illustration purposes only. The lines M1A1, M1A2 . . . and M3A3 may be connected in parallel to one or more of the transmission lines 9a, 9b or 9c to provide rate modulated data pulses corresponding to the rate or rates of the anti-carries or the trains or pulses applied to the qualified gate or gates. The rates of the data pulses may be the same or different at the outputs S1 and S2 depending upon the demands of the connected circuits. Where more than one AND gate is used to provide data pulses to OR gates G28 and/or G29, for clarity, lines 31 to 38 are provided to interconnect the outputs of the associated AND gates and to connect them to the OR gates. Since the lines 9a, 9b and 9c are continuously applying pulses P1, P2 and P3 to the AND gates of the matrix portion 8, the one read-in line of matrix portion 8 carrying voltage representing the Mach and altitude ranges will qualify the associated gate or gates and produce the desired data pulses.

The lines M1A1 and 9c are connected to AND gate G10 whose output 10 is connected to OR gates G28 and G29. Therefore voltage in line M1A1 will produce data pulses at a .125f pulse rate at both outputs S1 and S2. The line M1A2 is connected to AND gates G11 and G12 while line 9b is connected to gate G11 and line 9c is connected to gate G12. The output 11 of gate G11 is connected to OR gate G29, and the output 12 of gate G12 is connected to output 11 and OR gate G28 by a line 30. Therefore, voltage in line M1A2 will produce data pulses at a .250f pulse rate at output S2, and a .375f pulse rate at output S1. The line M1A3 is connected to AND gates G13, G14 and G15 to which are connected lines 9a, 9b and 9c, respectively. The output 15 from gate G15 is connected to the output 13 from gate G13 by a line 31 and to OR gate G28. The output 14 from gate G14 is connected to output 15 by a line 35 and to OR gate G29. Therefore, voltage in line M1A3 will produce data pulses at a .625f pulse rate at output S1, and a .375f pulse rate at output S2.

The lines M2A1 and 9b are connected to AND gate G16 whose output 16 is connected to OR gates G28 and G29. Therefore, voltage in line M2A1 will produce voltage pulses at both outputs S1 and S2 at a .250f pulse rate. The lines M2A2 and 9a are connected to AND gate G17 whose output 17 is connected to OR gates G28 and G29. Therefore, voltage in line M2A2 will produce data pulses at both outputs S1 and S2 at a .500f pulse rate. The line M2A3 is connected to AND gates G18, G19 and G20 to which are also connected lines 9a, 9b and 9c, respectively. A line 32 connects output lines 18 and 19 from gates G18 and G19 to each other and to OR gate G28 while a line 36 connects the output line 20 from gate G20 and line 18 to each other and to OR gate G29. Therefore, voltage in line M2A3 will produce data pulse at a .750f pulse rate at output S, and a .625f pulse rate at output S2.

The lines M3A1 and 9a are connected to AND gate G21 whose output 21 is connected to OR gates G28 and G29. Therefore, voltage in line M3A1 will produce data pulses at outputs S1 and S2 at a .500f pulse rate. The line M3A2 is connected to AND gates G22, G23 and G24 to which are connected lines 9a, 9b and 9c respectively. A line 33 connects the output 22 of gate G22 and output 23 of gate G23 to each other and to OR gate G28 while a line 37 connects output 22 and the output 24 of gate G24 to each other and to OR gate G29. Therefore, voltage in line M3A2 will produce data pulses at a .750f pulse rate at output S1, and a .625f pulse rate at output S2. The line M3A3 is connected to AND gates G25, G26 and G27 to which are connected lines 9a, 9b and 9c, respectively. A line 34 connects the outputs 25, 26 and 27 of the gates G25, G26 and G27, respectively, together and to OR gate G28 while a line 38 connects outputs 25 and 26 together and to OR gate G29. Therefore, voltage in line M3A3 produces data pulses at a .875f pulse rate at output S1, and a .750f pulse rate at output S2.

When only one Mach read-in line, one altitude read-in line and one pulse transmission line provides data pulses, a modified gate as shown in FIGURE 4 may be used. The AND gate G110, equivalent to AND gates G1 and G10, interconnects read-in lines M1 and A1, and pulse transmission line 9c. Signals and pulses simultaneously presented by the interconnected lines qualify gate G110 to produce data pulses at its output line 110 which correspond to the data pulses at output line 10 of FIGURE 1B.

In operation at an orbitrary instant, the sources 1 and 2 are providing voltages representing the first Mach range and the second altitude range, respectively. The voltage representing Mach is applied to the signal deriving network 4 which energizes the line M1 to partially qualify AND gates G1, G2 and G3. The voltage representing altitude is applied to the signal deriving network 5 which energizes line A2 to partially qualify AND gates G2, G5 and G8. The AND gate G2 is the only gate in the matrix portion 3 that is fully qualified and transmits signals to energize line M1A2. The line M1A2 applies voltage signals to AND gates G11 and G12 of matrix portion 8 which are receiving trains of pulses P2 and P3, respectively, from lines 9b and 9c. The gates G11 and G12 are fully qualified and therefore pass data pulses to their respective outputs 11 and 12. The outputs 11 and 12 being connected to each other and to OR gate G28 provide pulses to the output S1 at a .375f pulse rate which corresponds to the combined rates of pulses P2 and P3. The line 11 is also connected to OR gate G29 to provide voltage pulses to the output S2 at a .250f pulse rate which corresponds to pulses P2.

As the speed of the craft changes to provide Mach signals representing the second Mach range, the voltage M now applied to the network 4 energizes line M2 to partially qualify gates G4, G5 and G6. The AND gate G5 is the only gate having voltage applied to both read-in lines M2 and A2, and therefore is fully qualified to pass voltage signals to the line M2A2. The line M2A2 is connected to AND gate G17 in the matrix portion 8, which is also connected to pulse line 9a, which is now fully qualified and passes data pulses to its output 17 at a .500f pulse rate equal to the rate of pulses P2. The output 17 applies these pulses to OR gates G28 and G29 which present the pulses at the corresponding outputs S1 and S2. Similarly, as the altitude of the craft changes, the data pulses presented at the outputs S1 and S2 would vary correspondingly due to the change of the transmission of AND gates in the matrix portions 3 and 8. Two matrix portions 3 and 8 are shown and described to provide clarity but may be combined into a single unit.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device for producing rate modulated data pulses as a function of a plurality of variables, comprising a network corresponding to each variable and having a plurality of read-in lines each singularly transmitting signals as a function of the associtaed variable, means for providing a plurality of trains of pulses each at a predetermined pulse rate and having a line for transmitting each train, and a plurality of gating means each interconnecting a read-in line of each network and a line transmitting a train of pulses, the gating means being connected in parallel to the lines transmitting trains of pulses and being selectively qualified by signals and pulses to transmit data pulses at its output rate modulated as a function of the variables.

2. The device according to claim 1 in which at least one gating means includes a first gate connected to a read-in line of each network and qualified to transmit signals at its output only when signals are simultaneously applied by the associated read-in lines, and another gate connected to the output of the first gate and to the associated transmission line and qualified to transmit data pulses at its output only when signals and pulses are simultaneously applied by the output of the first gate and the associated transmission line.

3. The device according to claim 1 in which at least one gating means includes a first gate connected to a read-in line of each network and qualified to transmit signals at its output only when signals are simultaneously applied by the associated read-in lines, and a plurality of other gates connected in parallel to the output of the first gate, each of the other gates being connected to a line transmitting a train of pulses at a preselected pulse rate and being qualified to transmit data pulses at its output at the rate of the associated train of pulses simultaneously with data pulses from the other gates only when signals and pulses are simultaneaously applied by the output of the first gate and the associated line transmitting the train of pulses.

4. The device according to claim 3 having means interconnecting a plurality of outputs of the other gates to provide data pulses at a rate corresponding to the combined rates of the data pulses transmitted by the interconnected outputs.

5. A device for producing data pulses at a preselected rate as a function of two variables, comprising a network of read-in lines corresponding to each variable, the read-in lines of each network singularly transmitting signals as a function of the associated variable, means for providing a plurality of trains of pulses at predetermined pulse rates and having a line for transmitting each of the trans, a plurality of gating means each interconnecting a read-in line of each network and a transmitting line to singularly interconnect each read-in line of each network to all the read-in lines of the other network and to provide a train of pulses at a preselected pulse rate to the signals at each interconnection, the gating means being connetced in parallel to the lines transmitting trains of pulses and each gating means being qualified to transmit data pulses at its output at the rate of the associated train of pulses only when signals and pulses are simultaneously applied by the associated lines.

6. The device according to claim 5 in which at least one gating means includes a first gate connected to a read-in line of each network and qualified to transmit signals at its output when signals are simultaneously applied by the associated lines, and another gate connected to the output of the first gate and to the associated transmission line and qualified to transmit data pulses at its output when signals and pulses are applied by the output of the first gate and the associated transmission line.

7. The device according to claim 5 in which at least one gating means includes a first gate connected to a read-in line of each network and qualified to transmit signals at its output when signals are simultaneously applied by the associated read-in lines, and a plurality of other gates connected to the output of the first gate, each of the other gates being connected to a line transmitting a train of pulses and being qualified to transmit data pulses at its output simultaneously with data pulses from the other gates when signals and pulses are simultaneously applied by the output of the first gate and the associated line transmitting the train of pulses.

8. The device according to claim 7 having means interconnecting a plurality of outputs of the other gates to provide data pulses at a rate corresponding to the combined rates of the data pulses transmitted by the interconnected outputs.

9. A device for producing data pulses at a predetermined rate as a function of a plurality of variables, comprising a network of read-in lines corresponding to each variable, the read-in lines of each network singularly transmitting signals as a function of the associated variable, a plurality of gates each interconnecting a read-in line of each network to singularly interconnect each read-in line of each network to all the read-in lines of each other network, each gate being qualified to transmit signals as a function of the variables at its output by signals simultaneously applied by the associated read-in lines, means continuously providing a plurality of pulse trains at preselected rates and having a line for transmitting each pulse train, and a plurality of gating means, at least one gating means being connected to the output of each gate and to a pulse train transmission line and being qualified to transmit data pulses at its output in response to the associated pulse train as a function of the variables by signals applied by the associated gate output, said gating means being connected in parallel to the pulse train transmission lines.

10. The device according to claim 9 in which a plurality of gating means are connected to the output of at least one of the gates, each gating means being connected to a pulse train transmission line and being qualified to transmit data pulses at its output in response to the associated pulse train, simultaneously with the data pulses from the other qualified gating means by signals applied by the associated gate output.

11. The device according to claim 10 having means interconnecting the outputs of a plurality of the gating means to provide data pulses at a rate corresponding to the combined rates of the data pulses transmitted by the interconnected outputs of the gating means.

References Cited by the Examiner

UNITED STATES PATENTS

| | | | |
|---|---|---|---|
| 2,719,285 | 9/55 | Greenfield | 340—203 |
| 2,910,237 | 10/59 | Meyer et al. | 235—164 |
| 2,913,179 | 11/59 | Gordon | 235—164 |
| 2,925,586 | 2/60 | Levy | 340—203 |

OTHER REFERENCES

Millman & Taub: Pulse and Digital Circuits, New York, McGraw-Hill, page 434, 1956.

Richards: Arithmetic Operations in Digital Computers, New York, Van Nostrand, page 53, 1955.

MALCOLM A. MORRISON, *Primary Examiner.*

L. MILLER ANDRUS, *Examiner.*